W. Horey,
Sharpening Reaper Knives,
№ 96. Reissued June 19, 1847.
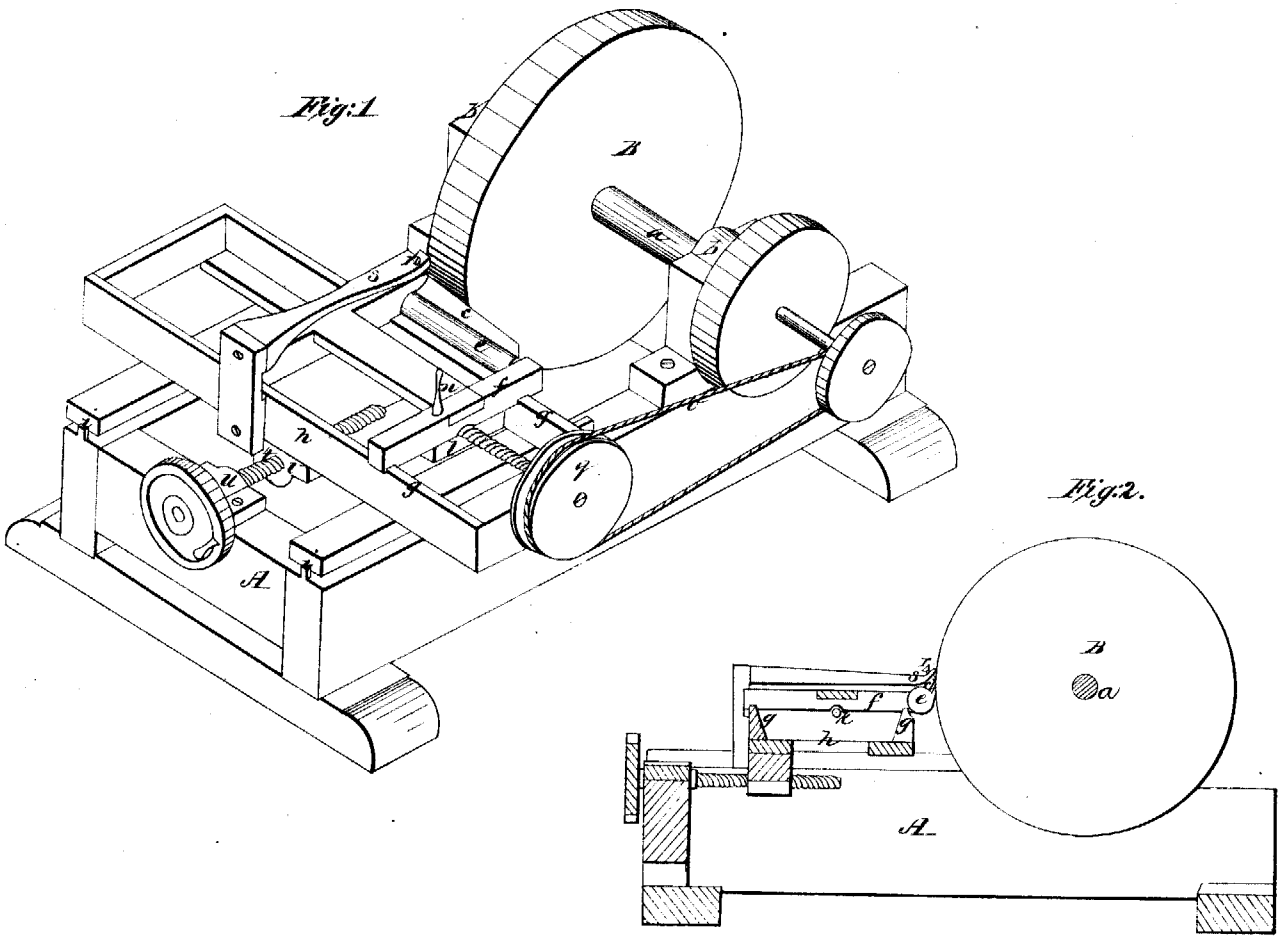
N. PETERS, PHOTO-LITHOGRAPHER, WASHINGTON, D. C.

UNITED STATES PATENT OFFICE.

WILLIAM HOVEY, OF WORCESTER, MASSACHUSETTS.

IMPROVEMENT IN MACHINERY FOR GRINDING TOOLS.

Specification forming part of Letters Patent No. 4,204, dated September 23, 1845; Reissue No. 96, dated June 19, 1847.

*To all whom it may concern:*

Be it known that I, WILLIAM HOVEY, of Worcester, in the State of Massachusetts, have invented a new and useful machine for grinding the twisted or spiral cutters or knives used in the machine for cutting straw, and generally known as "Hovey's Straw-Cutter," or any cylinder-knives which require a sharp chisel-edge that cut on a roller; and I do hereby declare that the following is a full, clear, and exact description of the principle or character which distinguishes my invention from all others before known, and of the manner of making, constructing, and using the same, reference being had to the accompanying drawings, making part of this specification, in which—

Figure 1 is a perspective representation of the machine, and Fig. 2 a transverse vertical section of the same.

The same letters indicate like parts in all the figures.

In the accompanying drawings, A represents the frame of the machine properly adapted to the operative parts. B is the grinding-wheel, made of stone or any other substance, mounted on a shaft, *a*, running in appropriate boxes *b b*, and provided with a pulley to receive motion from any first mover. The spiral or twisted blades or cutters *c* (such as are used in my straw-cutter) are attached by screws to a flange on the stock or shaft *e*, corresponding in form to the arms to which they are attached in my straw-cutter, their plane radiating from the axis, or nearly so, and, as before stated, they cut by pressure applied in the line of the radii, or nearly so. This stock *e* is hung by center pins to the forward part of a carriage, *f*, which traverses longitudinally and parallel with the axis of the grinding-wheel B on ways *g g* on another carriage, *h*, which slides on ways *i i* on the frame A, and at right angles to the motion of the upper carriage, *f*. The traversing motion of the upper carriage, *f*, is given by a screw, *k*, having its bearings in the under carriage, *h*, that passes through a hole in the end of the upper carriage, *f*, the lower piece, *l*, being provided with threads to take in the threads of the screw, and one end jointed to the end piece of the carriage, and the other provided with a jointed catch-link, *n*, so as to connect the carriage with the screw to traverse the cutter or knife when presented to the action of the grinder, and to disconneet it for the purpose of running back the carriage. Motion is given to the screw by a belt, *o*, from a small pulley on the shaft of the grinder to a large one, *q*, on the screw, to reduce the motion. The spiral blade is kept up to the grinder as it traverses by means of a gage-screw, *r*, that passes through an arm, *s*, attached to the under carriage, *h*, and in front of the grinding-surface of the grinder, so as to insure the reduction of the edge of the spiral or twisted knife to a line which, when applied to the stock of the straw-cutter, will generate a cylinder. The motion of the under carriage, *h*, from and toward the grinder is effected by a screw, *t*, which has its bearing in a box, *u*, in the frame, and takes in a nut, *v*, at the bottom of the carriage, and is provided with a crank-handle for the purpose of increasing or decreasing the obliquity of the back to be ground, and to adapt it to the wear of the grinder; and the gage *r* is tapped in the arm *s*, that it may be regulated to the position given to the knife by this carriage.

The nature of my invention consists in the addition and combination of certain parts or elements of machinery to produce a new and useful result—viz., the grinding or reducing to a sharp or chisel edge the knives or cutters such as are used on my straw-cutters, or any other cylinder-cutters that operate and cut on a roller by a pressure of the edges of the knives against the surface of the roller as they revolve in connection, as also the method of transferring them from the stock of the grinding-machine to the stock of the straw-cutter, or from one straw-cutter to another, if necessary, by means of which method or arrangement the cylinder-knives for straw-cutters or any cylinder-cutters which cut on a roller become an independent article of merchandise, and can be sent separately to any part of the country and fitted to the cylinders of straw-cutters having flanges or wings corresponding in size and form with the flange or wing of the stock of the grinding-machine. I class these parts or elements as follows: first, the main frame and grinder; second, the traversing carriages; third, the mechanical arrangements to give motion to the machine; fourth, the extra stock with flange; fifth, the adjustable arm and gage-screw.

I do not claim the invention or combination of the first, second, or third parts or elements of machinery as combined in this machine, standing alone, as that has been used before for other purposes; but the fourth and fifth parts or elements of this combination I do consider sufficiently new in their application in combination with the first, second, and third parts or elements as to produce the desired result and to constitute an entire new combination of the whole five parts or elements of machinery.

I will here describe the stock *c* as used and applied by me in this combination, and also the arm *s* with the gage-screw *r*, which I consider as new and important parts of the combination. The stock *c*, I make and apply as follows: I take one of the stocks of the straw-cutter with all the wings or flanges cast on the same. I then cut off all the wings or flanges but one. This I leave on the stock, which flange, of course, will be a duplicate of all the flanges on the cylinder or stock of the straw-cutter, and the body of the stock will be the same. I apply this separate stock to my grinding-machine as a part of the machine for the purpose of holding the knives in a proper position to be ground to a sharp chisel or bevel edge. I then attach by screws or other suitable fastening one knife to the face of this flange, projecting from said stock, and by means of a grinder and other parts combined it is ground to a sharp chisel-edge, if required, such as are used for cutting straw, &c., by cutting on a roller. When one knife is thus ground, it is detached from the flange on the stock of the grinder, and transferred to one of the flanges of the stock of the straw-cutter, and it there assumes the same position that it did on the stock of the grinder while being ground. By repeating that operation all my knives are ground and transferred to the cylinder-stocks of the straw-cutters. The importance of this extra stock will be obvious when it is understood that a single knife cannot be ground in this machine if attached to the stock of the straw-cutter, as the flanges or wings would interfere with the grinder and prevent the back of the knife from coming in contact with it so as to give the proper bevel to the cutting-edge. There is another great advantage derived from this extra stock on which the knives are ground. In consequence of the face of the flange which holds the knife being a duplicate of the faces of all the flanges on the stocks of the straw-cutter, they can be transferred from the grinder of the straw-cutter and from one straw-cutter to another, which makes them an article of merchandise independent of the other parts of the straw-cutter. This stock *c* in all cases for grinding spiral knives must correspond in size and form with the stock of the straw-cutters, and the face of the flange must be an exact duplicate of the faces of all the flanges of the straw-cutter. This "extra stock," as I have termed it, thus becomes a part of the grinding-machine as much as the grindstone itself.

The gage-screw *r* and the arm *s* are also considerd important parts of the combination, which I describe as follows: The arm *s* is made in the form of a goose-neck and attached to the outside of the bottom carriage, as shown in the drawings. It is so attached that it can be raised or lowered to accommodate the size or diameter of any cylinder-knife required to be ground. The back of the knives is pressed up hard against the face of the grinder by means of this screw, in connection with the arm *s* and the gage-screw *r*, both being adjustable. The point of the screw can be so applied as to press against the face of the knife near its edge as it traverses longitudinally before the grinder, and will serve not only to give the twist to the ground bevel of the knife corresponding with the twist of the faces, but will hold it firm against the grinder as the edge traverses between the face of the grinder and the point of the gage-screw *r* while in the operation of grinding. It is important that this arm *s* should be made as strong and inflexible as possible while the operation of grinding is performed, in order to prevent the knife from yielding or giving back from the face of the grinder while being ground, and preventing at the same time the point of the gage-screw *r* from moving or yielding laterally as the knife traverses lengthwise between the point of the screw and the face of the grinder. This arm may be so shaped as to answer a similar purpose without using the gage-screw *r*. It may be pointed at the end where the screw is inserted, so as to press against the face of the knife and hold it in contact with the grinder; or it may be made a permanent fixture and the grinder arranged so as to adjust its bearing on the back of the knife; but in any event the gage that bears the knife against the grinder while being ground must be inflexible, or as nearly so as possible, to insure a cylindrical edge to a knife when ground to a flat bevel. It is also important that the point of the gage-screw *r* or the point of the gage should be placed against the knife near the edge, and the grinder so fitted that a narrow face should be presented to come in contact with the back of the knife. The point of the gage should be directly in front of the narrow face of the grinder to insure a true and straight cylindrical edge to the knife. It is important that the bottom carriage should be kept firm in its proper position while the machine is in the operation of grinding, and that the upper traversing carriage should be sufficiently weighted to keep it from yielding from the grinder.

What I claim as my invention, and desire to secure by Letters Patent, is—

The application of the stock *c* and the arm *s*, in combination with the other parts or elements of machinery, substantially in the manner described, and for the purposes above set forth.

Witnesses: WILLIAM HOVEY.
J. J. GREENOUGH,
J. S. SMITH.